A. J. & C. E. WILLIAMS.
TOMATO PEELER.
APPLICATION FILED JULY 19, 1911.
1,023,700.
Patented Apr. 16, 1912.
2 SHEETS—SHEET 1.
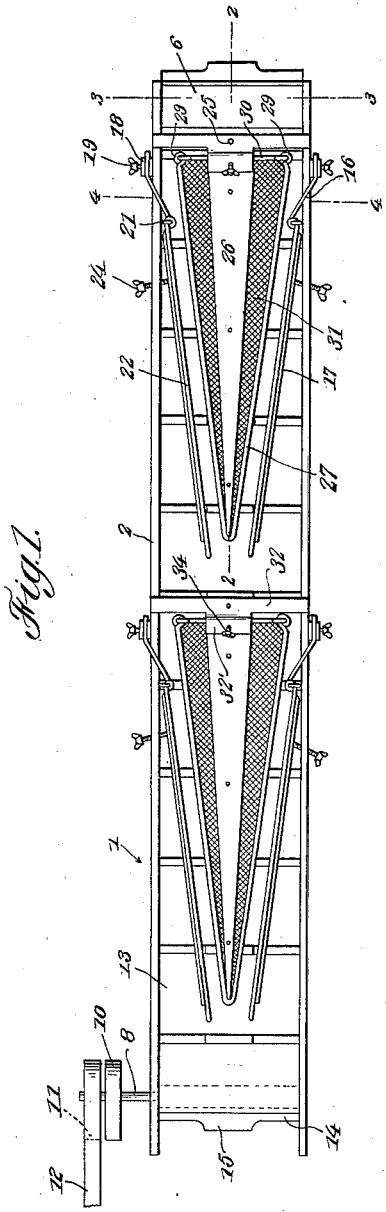
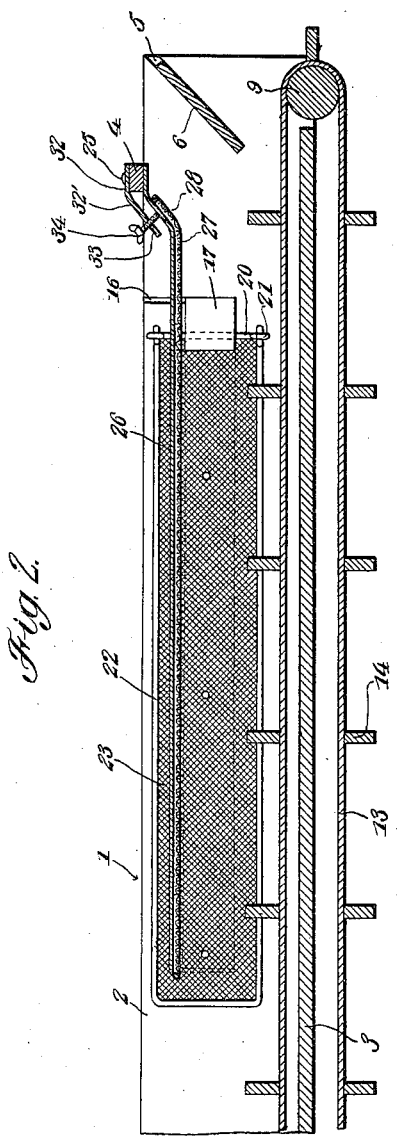
Witnesses
J. H. Crawford
Inventors
Andrew J. Williams,
Charles E. Williams,
By Victor J. Evans
Attorney

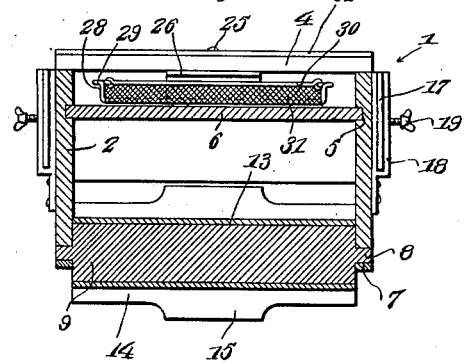

UNITED STATES PATENT OFFICE.

ANDREW J. WILLIAMS AND CHARLES E. WILLIAMS, OF STURGIS, SOUTH DAKOTA, ASSIGNORS TO ROBERT W. McMILLAN AND LEO G. DESSEL, OF VALE, SOUTH DAKOTA.

TOMATO-PEELER.

1,023,700.  Specification of Letters Patent.  Patented Apr. 16, 1912.

Application filed July 19, 1911. Serial No. 639,289.

*To all whom it may concern:*

Be it known that we, ANDREW J. WILLIAMS and CHARLES E. WILLIAMS, citizens of the United States, residing at Sturgis, in the State of South Dakota, have invented new and useful Improvements in Tomato-Peelers, of which the following is a specification.

This invention relates to improvements in apparatus for removing the skins of fruits or vegetables after the same have been treated by a mechanical process to loosen the skins from the meat.

The primary object of the invention is to provide an apparatus of this class which will successfully remove the skins from the fruit or vegetable without bruising or otherwise injuring the same.

Another object of the invention is to provide an apparatus of this class wherein the fruit is delivered to a suitable trough provided with an endless conveyer, the said trough being provided with a plurality of decorticating blades arranged in series, the said blades being so positioned as to contact and turn the fruit so that all of the sides thereof will be engaged by the blades as the fruit passes through the trough.

A still further object of the invention is to provide in an apparatus of this class, a plurality of yieldable blades, the side members of the same coöperating with the flights of an endless conveyer, so that the said blades will be automatically opened or spread apart when contacted by one of the flights in order to deliver the fruit either to another series of blades or to a receptacle for the fruit. With the above objects in view, and others which will appear as the nature of the invention progresses, the improvement resides in the novel construction and arrangement of parts hereinafter fully described and claimed.

In the drawings, accompanying this specification, there has been illustrated a simple and approved apparatus constructed in accordance with the present invention, it being understood, however, that the showing therein is merely illustrative and that changes in the minor details of construction, such as to size, proportion, shape, materal, etc., which fall within the scope of the appended claims may be resorted to if desired.

In the drawings, Figure 1 is a top plan view of an apparatus constructed in accordance with the present invention. Fig. 2 is a central longitudinal section taken upon the line 2—2 of Fig. 1. Fig. 3 is a transverse section taken upon the line 3—3 of Fig. 1. Fig. 4 is a similar section taken upon the line 4—4 of Fig. 1. Fig. 5 is a detail horizontal sectional view illustrating the manner of securing one of the side blades to the side of the trough and also illustrating the manner of adjusting the spring connected with the blade. Fig. 6 is a detail perspective view of one of the side blades detached. Fig. 7 is a detail perspective view of the top blade detached.

The improved apparatus is primarily intended for use in removing the skins from tomatoes, but as heretofore stated the apparatus may be employed in connection with other vegetables or fruits.

In the drawings, in which like reference characters designate corresponding parts throughout, the numeral 1 designates the trough of the apparatus. This trough comprises a pair of side members 2 and a bottom member 3, the latter being secured to the side members in any desired or preferred manner. The side members 2 are provided at spaced intervals with transversely arranged connecting bars 4, the same serving as a means for effectively sustaining the said side members in proper relation to each other, as well as for a separate purpose which will hereinafter be fully set forth.

One end of the trough 1, has its sides 2 formed with inclined depressions 5, the latter adapted to receive the ends of a door or board 6, the said board being arranged adjacent the delivery hopper of the steaming or mechanical apparatus by which the tomatoes are first treated, and the said door serves as a chute for delivering the tomatoes to the trough 1.

The bottom 3 of the trough 1 does not extend the entire length of the sides of the said trough, but terminate a suitable distance beyond the opposite ends of the said sides. The portion of the sides adjacent the bottom edges thereof beyond the terminals of the edges of the bottom are formed or otherwise provided with suitable bearings 7, the said bearings adapted to receive the trunnions 8 provided upon the opposite ends of the rollers 9. One of the trunnions 8 upon one of the rollers is extended a suitable distance beyond its bearing, the said extending portion being adapted to receive a loose pulley 10 and a rigidly connected pulley 11.

The numeral 12 designates a belt which is adapted to engage either of the pulleys, suitable means being provided for shifting the said belt to rotate the roller or to permit the same to remain idle.

The rollers 9 are adapted to receive an endless conveyer 13, the same passing both above and below the bottom 3 of the trough 1. The conveyer is of a width substantially equaling the distance between the sides 2 of the trough, and the said conveyer is preferably constructed of some suitable fibrous material having spaced flights 14. By reference to the several figures of the drawing, it will be noted that the flights 14 have their central or body portions of a slightly greater height than the said ends thereof, and the said higher portions, designated by the numeral 15 are adapted to serve as means for opening the side blades of the apparatus to permit of the outlet of the tomato from between the flights, as will hereinafter be more fully set forth.

The sides 2 of the trough are preferably provided with oppositely arranged inclined slits 16, each of the same being adapted to receive one end of a flattened spring member 17. The outer faces of the sides are provided with suitable sockets 18 through which the extremities of the springs 17 pass and the said springs are secured within the sockets through the medium of removable retaining elements 19. Each of these flattened springs 17 has connected thereto a vertically arranged bar 20 having its opposite ends provided with eyes 21, and connected with the said eyes are looped ends of a substantially rectangular frame 22. Each of the frames 22 is provided with a reticulated facing, preferably a wire mesh, designated by the numeral 23, and the frame and mesh provide the side blades for the apparatus. The springs 17 are secured adjacent the outer extremities of the frames 22, the same being adapted to exert a pressure upon the said frames so as to normally force the blades toward each other and toward the center of the trough. The tension of the springs 17 is regulated through the medium of suitable adjusting devices, such as thumb screws 24, the same passing through threaded openings in the sides of the trough and into engagement with the upper faces of the springs. By this arrangement, it will be noted that the reticulated members and their frames, which may be collectively designated as the side blades, can be adjusted to provide for the amount of pressure exerted by the said blades upon the surface of the tomato with which they are adapted to contact.

Secured to the connecting bars 4, through the medium of a removable pin 25 is a longitudinally extending spring member 26. This spring member has its body portion substantially V-shaped and connected with the said spring is a substantially V-shaped frame 27. This frame 27 has its inner, or spread portion bent upwardly as at 28, and the extremity of the sides of the frame are provided with suitable loops 29 which are adapted to engage with eyes 30 provided upon a bar secured to the spring 26 and projecting beyond the side edges thereof. The frame 27 is provided with a reticulated facing, the same being preferably formed of a wire mesh, as designated by the numeral 31, and it will be noted that by providing the frame with the offset or bent portion 28 the tomato before passing between the side blades contacts with the reticulated surface of the said upturned portion so that a portion of the skin of the vegetable will be removed before the same is contacted by the said side blades, it being of course understood that the endless conveyer is in motion.

The numeral 32 designates a projected arm provided upon each of the connecting bars 4. This arm has its outer extremity bent downwardly at at 32', and the said bent portion being provided with a threaded opening 33, the latter adapted to coact with an adjusting element, such as a thumb screw 34. This thumb screw 34 is adapted to contact with the spring 26 so as to regulate the tension of the said spring with relation to the endless conveyer, the side blades and the vegetable contacted by the said side blades.

The elements comprising the frame and spring will hereinafter be referred to as the upper blade of the device, and briefly stated the operation of the apparatus is as follows: The vegetables having been subjected to a suitable process for softening the skins thereof for the removal of the same, are delivered upon the inclined board 6 to the endless conveyer. The bent or upturned portion 28 of the upper blade first contacts with the vegetable, the flights of the conveyer forcing the same beneath the blade proper. The vegetable contacting with the said offset portion is revolved and when the same passes between the upper blade and the side blades it will be rotated upon an opposite axis to that caused by this contact with the bent portion 28 of the upper blade. It is to be understood that only one tomato is delivered between each of the flights of the conveyer and the spring-pressed side blades contacting with said tomato as well as the top blade engaging with the same, the skin is effectively removed from the said tomato without bruising the same. As the side blades are arranged within the path of the flights of the conveyer, the extensions 15 of the said flights will part the said side blades so as to allow the tomato to be conveyed to the next series of blades or to the receptacle for the tomatoes.

From the above description, taken in connection with the accompanying drawings, the simplicity of the device, the effectiveness of the same, as well as the method of operation will, it is thought be fully apparent to those skilled in the art to which such inventions appertain without further detail description.

Having thus described the invention what we claim is:

1. In an apparatus for peeling tomatoes, a trough, a conveyer having flights mounted for movement upon the trough, reticulated side blades within the trough, a reticulated top blade arranged between the side blades, and the flights being centrally provided with enlarged portions adapted to contact with the ends of the side blades to successively open the said ends.

2. In a device for the purpose set forth, a trough, an endless conveyer mounted for movement within the trough, flights for the conveyer, reticulated side blades within the trough, the said blades being arranged opposite each other and being provided with means for forcing their free ends toward each other, a reticulated top blade, a spring element connected with the top blade, means for regulating the tension of the spring element, and means provided by the flights for forcing the ends of the blades away from each other.

3. In an apparatus of the class described, a trough, an endless conveyer carried by the trough, means for actuating the conveyer, flights upon the conveyer, reticulated side blades arranged in pairs adjacent the sides of the trough, said blades being provided with spring elements which are connected to the sides of the trough, means for regulating the blades, to bring their ends toward or away from each other, a top blade overlying the side blades, said top blade having its outer extremity formed with an upturned portion, and means comprising the flights of the conveyer for separating the side blades.

4. In a device for the purpose set forth, a trough, an endless conveyer carried by the trough, flights upon the conveyer, said blades resiliently secured to the trough, means for forcing the free ends of the side blades toward each other, an upper substantially V-shaped blade arranged between the side blades, a tension element for the upper blade, means provided by the flights for forcing the free ends of the side blades away from each other, and an inclined delivery entrance for the trough.

5. In an apparatus for the purpose set forth, a substantially rectangular trough, an endless conveyer within the trough, means for actuating the conveyer, the sides of the trough being provided with inclined slits arranged opposite each other, flattened spring members having one of their ends passing through the slits, means for removably connecting the spring members to the sides of the trough, each of said spring members connected to a substantially rectangular reticulated blade, adjusting elements carried by the sides of the trough to regulate the tension of the spring members and to normally force the ends of the blades toward each other, the trough being provided with connecting bars, a flattened off-set spring member removably connected with each of the bars, a substantially V-shaped reticulated blade connected with each of the springs, each of said blades adapted to normally lie between the side blades, means for regulating the tension of the springs of each of the top blades, and means provided by the flights of the conveyer for spreading the free ends of the side blades when the conveyer is in motion.

6. In an apparatus for the purpose set forth, a conveyer carried by the trough, flights upon the conveyer, said flights having their central portions raised, spring pressed reticulated blades arranged in pairs within the trough, the said blades having their free ends arranged at an angle and toward each other, an upper substantially V-shaped blade, a spring for this blade, means for regulating the springs of all of the blades, and the raised portion of the flights adapted to contact with and to separate the side blades, substantially as and for the purpose set forth.

In testimony whereof we affix our signatures in presence of two witnesses.

ANDREW J. WILLIAMS.
CHARLES E. WILLIAMS.

Witnesses:
W. J. DOHERTY,
WESLEY A. STUART.

Copies of this patent may be obtained for five cents each, by addressing the "Commissioner of Patents. Washington, D. C."